Aug. 7, 1928.
E. R. BURTNETT
1,679,959
INTERNAL COMBUSTION ENGINE
Filed April 6, 1926
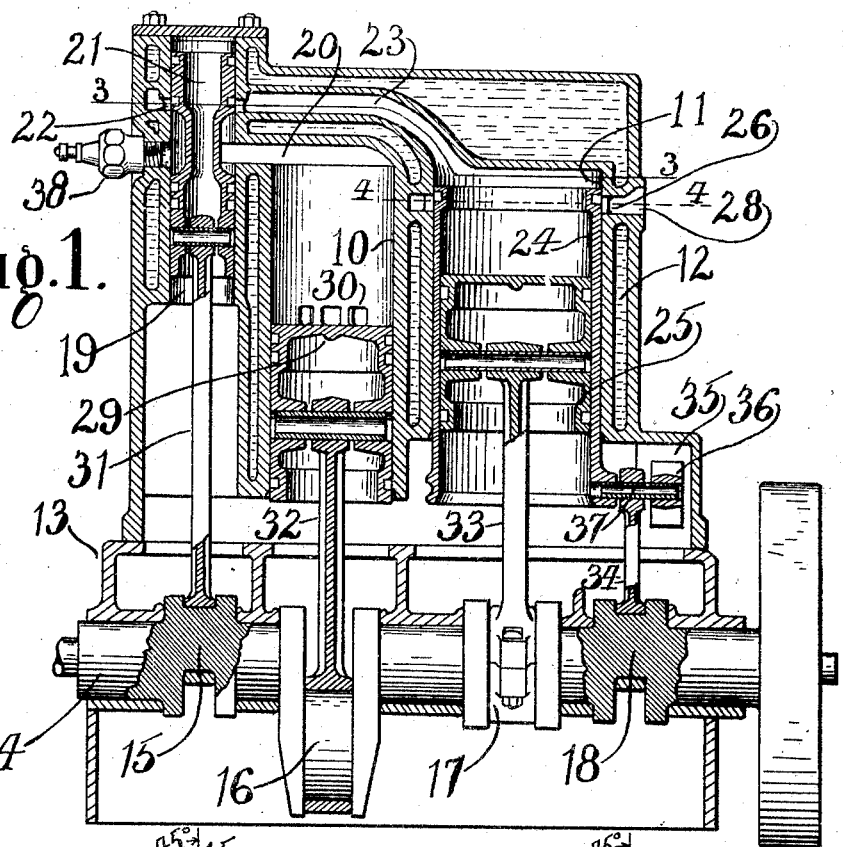
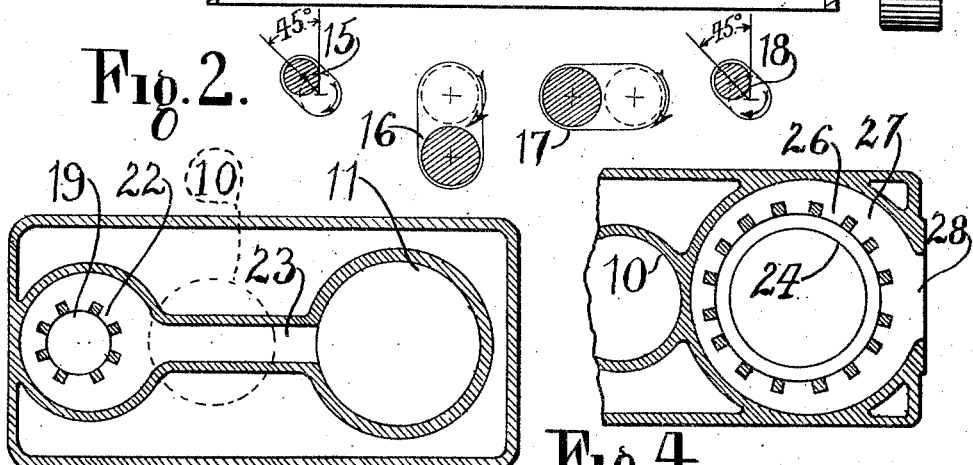
INVENTOR
Everett R. Burtnett Patented Aug. 7, 1928.

1,679,959

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION.

INTERNAL-COMBUSTION ENGINE.

Application filed April 6, 1926. Serial No. 100,042.

My invention relates to improvements in internal combustion engines of the two stroke cycle type; and the objects of my improvements are; first, to provide a balanced valve for admission of fresh charge into a combustion chamber with a sleeve valve for admission of fresh charge into a fresh charge pumping cylinder; second, to afford facilities for supercharging the combustion chamber with fresh charge.

A two stroke cycle internal combustion engine must in any case have a fresh charge pump of some kind. I prefer to use a piston pump for each combustion chamber and to provide a reciprocating valve to the combustion chamber which can be related in stroke movement to the stroke movement of the working piston of a given combustion chamber in any time desired without developing a driving influence upon the said valve adapted to charge admission to the combustion chamber and to provide a sleeve valve arranged for reciprocatory movement within the charge pump cylinder for the admission of fresh charge into the charge pump cylinder, a sleeve valve adapted for an inlet function only may have inlet ports arranged in an annular row in the cylinder wall for the full circumference of the said cylinder wall and provide the greatest total port area to a given weight, diameter and stroke movement in inches.

With the foregoing and other objects in view, my invention consists in certain novel features of construction and arrangement of parts that will be hereinafter more fully described, claimed and illustrated in the accompanying drawings in which:

Fig. 1 is a vertical section taken lengthwise through the center of a unit of my improved construction.

Fig. 2 is a diagrammatic view that graphically illustrates the relative positions of the crank pins on the crank shaft of my improved engine.

Fig. 3 is a horizontal section taken on line 3—3 of Fig. 1.

Fig. 4 is a horizontal section taken on line 4—4 of Fig. 1.

Referring by numerals to the accompanying drawings, which illustrate a practical embodiment of my invention, 10 designates the combustion cylinder, and 11 the fresh charge pumping cylinder, the same may be separately or integrally formed and arranged side by side with their axes substantially parallel.

The walls of these cylinders are preferably formed with connected chambers, 12, through which may be circulated a fluid medium such as water.

The cylinders 10 and 11 surmount a suitable crank case 13 and journaled in suitable main bearings that are formed on the crank case is a crank shaft 14. There are four cranks—15, 16, 17 and 18—formed of the crank shaft, the crank pin 17 being arranged 90° in advance rotatively with respect to the turning direction of the crank shaft of the crank pin 16. The crank pin 15 is arranged substantially 135° in advance rotatively relative to the crank pin 16 and the crank pin 18 is arranged substantially 45° in advance rotatively relative to the crank pin 17.

A second and preferably relatively small bore cylinder 19 is formed as a second cylinder to the combustion clearance chamber 20 of the combustion cylinder 10. Arranged for a reciprocatory movement within the said cylinder 19 is a balanced valve 21, an annular row of fresh charge transfer ports 22 are formed in the wall of the cylinder 19. A passage communication between the chambers within the cylinders 10 and 19 is established by the lateral extension of the combustion clearance chamber 20, through the wall of the cylinder 19. The transfer ports 22 are formed in the cylinder 19 in a position headward of the point at which the said communicating passage intersects the bore of the said cylinder 19.

The balanced valve 21 is formed with two skirts and the said valve is arranged to reciprocate in a stroke position so that the head end skirt of the balanced valve will engage the cylinder 19 headward of the communicating passage which joins the chambers of the two combustion cylinders 10 and 19.

A fresh charge transfer duct 23 is formed as a communicating passage between the chamber of the fresh charge pump cylinder 11 and the annular row of transfer ports 22.

A sleeve valve 24 is arranged for reciprocatory movement within the fresh charge pump cylinder 11 and a fresh charge pumping piston 25 is arranged for reciprocatory movement within the said sleeve valve 24.

A series of fresh charge inlet ports 26, are arranged as an annular row of charge admission openings though the wall of the fresh charge pump cylinder 11, an annular passage 27 is formed around the said annular row of inlet ports formed through the wall of the charge pump cylinder 11 and extends to an inlet opening 28, to which may be attached any suitable means of providing the desired fresh charge.

A combustion charge expansion power piston 29 is arranged for reciprocatory movement within the combustion cylinder 10. Exhaust ports 30 are formed through the wall of the combustion cylinder 10, at a point relative to the stroke movement of the power piston 29, which will allow the said exhaust ports to be wholly uncovered and opened only when the said power piston 29 is in the position of crank end dead center.

The balanced valve 21 is attached to the crank pin 15 of the crank shaft by a conventional connecting rod 31, the power piston 29 is attached to the crank pin 16 of the crank shaft by a connecting rod 32, the charge pumping piston 25 is attached to the crank pin 17 of the crank shaft by a connecting rod 33, and the sleeve valve 24 is attached to the crank pin 18 of the crank shaft by a connecting rod 34.

To prevent the sleeve valve from being twisted by the angularity of the connecting rod when the crank pin 18 passes out of the plane of the axes of the stroke of the said sleeve, I provide a guide 35, and a shoe 36. The shoe 36, may be attached to the wrist pin 37, of the sleeve valve in any suitable manner.

I preferably provide expansion rings in the face of each of the two skirts of the balanced valve 21, also one or more expansion rings may be arranged in the head end of the face of the sleeve valve 24, and expansion rings are conventionally applied to the pistons 25 and 29. A spark plug 38, is preferably located in the wall of the inlet valve cylinder to the combustion chamber.

In the accompanying drawings, I show the balanced valve of the combustion chamber and the sleeve valve of the fresh charge pumping cylinder connected directly to the main crank shaft, crank pins 15 and 18, being provided thereof. It should be understood that an auxiliary shaft may be used to impart the necessary reciprocative movement to the said balanced and sleeve valve if desired in preference to their being directly connected to the main crank shaft without departure from the spirit of the invention. The operation of the auxiliary shaft would necessarily be of one to one ratio to the rotation speed of the main crank shaft since the structure and arrangement of ports are designed to function in the operation of the engine in two stroke cycle.

The operation of my improved two stroke cycle engine is as follows:

Owing to the relative positions of cranks 16 and 17, said crank 17 being 90° in advance of crank 16 in the direction of crank rotation, the charge pump piston 25 travels relatively 90° in advance of the power piston 29, in stroke movement. Assuming the pistons, valve members and cranks to be in the position as illustrated in the accompanying drawings, the power piston 29, at crank end dead center, the exhaust ports 30 being wholly uncovered and open to the combustion chamber, the balanced inlet valve 21, of the combustion chamber is in a position relative to the crank pin 15, position 45° before head end dead center, the balanced valve is moving headwardly and the crank end edge of the head end skirt of the said balanced valve is at a point in line with the crank end edge of the row of charge transfer ports 22, at the moment of opening the said transfer ports by further movement of the said balanced valve headward. At this moment, the charge pump piston 25, is approximately one half headward on the compression stroke, with the crank pin 17, to which it is attached in the rotary position half way between head end and crank end dead center.

The exhaust ports have been open for the duration of time corresponding to the time of rotary movement of the crank 16 from 45° before crank end dead center to crank end dead center, the position it now occupies, the residual contents of the combustion chamber have escaped to the atmosphere to a sufficient degree which will have caused the pressure within the combustion chamber to have dropped to very near atmospheric.

At this moment, the sleeve valve 24, within the charge pump cylinder 11, is in a position approaching head end dead center, with the crank pin 18 to which the said sleeve valve is connected in a position 45° before head end dead center. The head end of the said sleeve valve being headward of the head end edge of the charge inlet ports 26, sealing the chamber of the pumping cylinder.

Further movement of the crank shaft will cause the transfer ports 22 to be opened and the charge pumping piston 25 to be moved headwardly on the compression stroke, forcing the contents of the charge pump cylinder 11 into the combustion cylinder 10. When the crank 16 has reached a position 45° after crank end dead center, the exhaust ports 30, will be closed, the transfer ports 22 will be fully open and the charge pump piston 25 will be approaching head and dead center with approximately one-eighth of the stroke yet to be made, the crank pin 17, being at this moment 45° before head end dead center.

Since the exhaust ports close at this moment, further movement of the charge pump piston 25, provides a super-induction of the fresh charge into the combustion chamber above atmospheric volume. If the ratio of bore and stroke or stroke sweep displacement between the charge pump and the combustion cylinders is such that the movement of the charge pump piston to the point where the exhaust ports are closed is equal to the total space of the stroke sweep displacement of the power piston within the combustion chamber and the space of the clearance chamber of the combustion cylinder, including the annular chamber around the balanced inlet valve within the combustion chamber, the super-induction of fresh charge into the combustion chamber will be of a very substantial ratio and without loss of fresh charge out of the exhaust ports.

The transfer ports, 22, will be closed by the headward movement of the balanced valve 21, at the moment the charge pump piston 25 reaches head end dead center and at which time the power piston 29 within the combustion cylinder 10 is approximately one-half way headward on the compression stroke with the crank 16 in a position half way between crank end and head end dead centers.

Further movement of the cranks develop compression within the combustion chamber and a suction in the charge pump chamber, when the charge pump piston 25 has moved crankwardly a short distance sufficient to cause the pressure within the chamber of the charge pump cylinder to drop to atmospheric or a little less when the engine is operated at full throttle opening, the head end edge of the sleeve valve 24 will move crankwardly beyond the inlet ports 26, permitting a new charge to be taken into the charge pump chamber.

When the power piston 29, reaches head end dead center, developing maximum compression within the combustion chamber, ignition occurs, developing combustion and an expansion period in power development within the combustion chamber, driving the power piston 29 crankwards through the cylinder 10, to the point whereby the exhaust ports are again opened. Thus, I have described the working order of the related parts of my improved two stroke cycle engine.

An engine of my improved construction is comparatively simple, may be easily machined and assembled, is provided with rugged, positively actuated and noiseless valvular arrangement for controlling the admission of fresh charge into the charge pumping cylinder and the admission of the fresh charge into the combustion chamber when transferred as induction from the pumping chamber into the combustion chamber.

It will be understood that minor changes in the size, form and construction of the various parts of my improved engine may be made and substituted for those herein described without departing from the spirit of the invention, the scope of which is set forth in the appended claims.

I claim as my invention:

1. In a two stroke cycle internal combustion engine, the combination of a combustion cylinder, an inlet valve cylinder, a passage communicating between the said inlet valve cylinder and the said combustion cylinder, a valve of balanced area exposed to the combustion chamber arranged for reciprocatory movement within the said inlet valve cylinder, a charge pumping cylinder, the three cylinders being arranged in a row with their axes parallel and the combustion cylinder being arranged between the pumping cylinder and the inlet valve cylinder, an inlet sleeve valve arranged for reciprocatory movement within the said charge pumping cylinder, a charge pumping piston arranged for reciprocatory movement within the said sleeve valve of the charge pumping cylinder, a series of ports formed through the wall of the said inlet valve cylinder, a duct leading from the head end of the said charge pumping cylinder to the said ports, said duct being disposed directly above and parallel with the passage that leads from the combustion chamber to the inlet valve chamber, a second series of ports formed through the wall of the charge pumping cylinder, an annular duct extending from a source of supply to the said series of ports formed in the wall of the charge pumping cylinder, means of actuating the valve of balanced area exposed to the combustion chamber whereby the ports formed through the wall of the said inlet valve cylinder will be opened and closed in two stroke cycle time by the reciprocatory movement of the said balanced area valve within the said inlet valve cylinder and means whereby the sleeve valve within the charge pumping cylinder will open and close the series of ports formed in the wall of the said charge pumping cylinder in two stroke cycle time by the reciprocatory movement of the said sleeve valve.

2. In a two stroke cycle internal combustion engine, the combination of a charge pumping cylinder, a combustion cylinder, an inlet valve cylinder adapted to the combustion cylinder, the three cylinders being arranged in a row with their axes parallel and with the piston valve cylinder on the opposite side of the combustion cylinder from the pumping cylinder, a valve of balanced area exposed to the combustion chamber arranged for reciprocatory movement within the said inlet valve cylinder of the combustion chamber, a sleeve valve arranged for reciprocatory movement within the charge pumping cylinder, the said sleeve valve being adapted to the valvular function of fresh charge admission to the said charge pumping cylinder, a passage communication between the fresh charge pump cylinder and the inlet valve cylinder within which the balanced area valve is arranged for reciprocatory movement, a duct leading from the head end of the combustion chamber to the intermediate portion of the inlet valve chamber, which duct is positioned directly beneath and parallel with the passage between the pumping cylinder and the inlet valve chamber, a power piston arranged for reciprocatory movement within the combustion cylinder, a charge pumping piston arranged for reciprocatory movement within the sleeve valve of the charge pumping cylinder, a crank shaft, two crank throws of the crank shaft, a connection between the power piston within the combustion cylinder and one of the said crank throws, a connection between the charge pumping piston within the sleeve of the charge pumping cylinder and the other of the two crank throws of the crank shaft and one of the two crank throws to which the charge pumping piston is connected being 90° in advance rotatively of the other of the two crank throws of the crank shaft to which the said power piston of the combustion cylinder is connected, exhaust ports formed through the wall of the combustion cylinder, ignition means adapted to the combustion chamber, and means of actuating the said balanced area valve of the combustion chamber and the sleeve valve of the charge pumping chamber in stroke of reciprocatory movement in stroke time one to one with the stroke time of the said power and charge pumping pistons.

3. The combination, a functionally related unit of three cylinders, a charge pumping cylinder, a combustion cylinder and a valve cylinder related to the combustion cylinder which three cylinders are arranged in a row with their axes parallel and with the combustion cylinder disposed between the pumping cylinder and the valve cylinder, a balanced area valve arranged for reciprocatory movement within the said valve cylinder, a power piston arranged for reciprocatory movement within the combustion cylinder, a sleeve valve arranged for reciprocatory movement within the charge pumping cylinder, a charge pumping piston arranged for reciprocatory movement within the said sleeve arranged within the said pumping cylinder, a passage communication between the said valve cylinder related to the combustion cylinder and the said combustion cylinder, a series of ports formed through the wall of the said valve cylinder related to the combustion cylinder, a series of ports formed through the wall of the charge pumping cylinder, a passage communication between the charge pumping cylinder and the series of ports formed through the wall of the said valve cylinder related to the combustion cylinder whereby the said ports formed through the wall of the said valve cylinder related to the combustion cylinder will be opened and closed to the said combustion chamber by the said valve member in two stroke cycle time, the two passages lying parallel with each other and one directly above the other within the cylinder head of the engine, means of actuating the sleeve valve within the charge pumping cylinder whereby the said ports formed through the wall of the charge pumping cylinder will be opened and closed to the charge pumping chamber by the said sleeve valve in two stroke cycle time.

4. In a two-stroke cycle internal combustion engine, a pumping cylinder, a combustion cylinder and a piston valve cylinder, which three cylinders are arranged in a row with their axes parallel, a duct leading from the head end of the chamber in the pumping cylinder to the upper portion of the piston valve cylinder, a duct leading from the head end of the chamber in the combustion cylinder to the intermediate portion of the piston valve cylinder, the last mentioned duct being disposed directly below the first mentioned duct, a balanced piston valve arranged for reciprocation within the piston valve cylinder, a piston arranged for operation within the combustion chamber, a sleeve valve arranged for operation within the pumping chamber, a crankshaft and connections from said piston valve, said pistons and said sleeve valve to said crankshaft.

In testimony whereof, I hereto affix my signature.

EVERETT R. BURTNETT.